United States Patent
Wilson-Jones et al.

(10) Patent No.: US 6,266,591 B1
(45) Date of Patent: *Jul. 24, 2001

(54) CONTROLLER FOR AN ELECTRIC POWER ASSISTED STEERING SYSTEM AND AN ELECTRIC POWER ASSISTED STEERING SYSTEM

(75) Inventors: Russell Wilson-Jones, Stratford-upon-Avon; Steven J Horton, Solihull, both of (GB)

(73) Assignee: TRW LucasVarity Electric Steering Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,616
(22) PCT Filed: Mar. 27, 1997
(86) PCT No.: PCT/GB97/00873
  § 371 Date: Sep. 29, 1998
  § 102(e) Date: Sep. 29, 1998
(87) PCT Pub. No.: WO97/36777
  PCT Pub. Date: Oct. 9, 1997

(30) Foreign Application Priority Data

Mar. 30, 1996 (GB) .................................................. 9606802

(51) Int. Cl.$^7$ ........................... A01B 69/00; B62D 11/00; B62D 5/04; G05D 1/00
(52) U.S. Cl. ............................ 701/41; 701/43; 180/421; 180/422; 180/443; 180/446
(58) Field of Search ........................ 701/41, 43; 180/412, 180/415, 421, 422, 423, 443, 446

(56) References Cited

U.S. PATENT DOCUMENTS

| | | | | |
|---|---|---|---|---|
| 4,591,014 | * | 5/1986 | Yasuda | 180/79.1 |
| 4,624,335 | * | 11/1986 | Shiraishi et al. | 180/142 |
| 4,753,310 | * | 6/1988 | Hashimoto | 180/79.1 |
| 4,793,431 | * | 12/1988 | Eto et al. | 180/142 |
| 4,961,033 | * | 10/1990 | Hirota | 318/560 |
| 5,000,278 | * | 3/1991 | Morishita | 180/79.1 |
| 5,027,276 | * | 6/1991 | Morishita et al. | 701/43 |
| 5,122,958 | * | 6/1992 | Eto et al. | 701/41 |
| 5,150,021 | * | 9/1992 | Kamono et al. | 318/488 |
| 5,259,473 | * | 11/1993 | Nishimoto | 180/79.1 |
| 5,271,474 | * | 12/1993 | Nishimoto et al. | 180/79.1 |
| 5,752,209 | * | 5/1998 | Nishimoto et al. | 701/41 |

* cited by examiner

Primary Examiner—Jacques H. Louis-Jacques
Assistant Examiner—Brian J Broadhead
(74) Attorney, Agent, or Firm—Andrus, Sceales, Starke & Sawall

(57) ABSTRACT

A controller for an electric power assisted steering system comprises a drive circuit (2) for controlling current to a motor (1) and a data processor (8) for controlling the motor current and hence assistance torque. A circuit (9) generates a current limit which is a monotonically decreasing function of vehicle speed. A comparator (6) compares motor current with the current limit and switches off the drive circuit (2) if the current limit is exceeded.

8 Claims, 4 Drawing Sheets

CONTROLLER FOR AN ELECTRIC POWER ASSISTED STEERING SYSTEM AND AN ELECTRIC POWER ASSISTED STEERING SYSTEM

BACKGROUND OF THE INVENTION

The present invention relates to a controller for an electric power assisted steering (EPAS) system for a vehicle and to an EPAS system.

In a known EPAS system comprising a controller controlling current to an electric motor which is mechanically connected to a component of the steering system, it is known to provide overall motor current limiting. For this purpose, the motor current is compared with a reference value and in the event that the motor current exceeds the reference value, power to the motor is cut off. The means which controls the power supply to the motor is supplied with a torque signal indicative of the torque applied to the vehicle steering wheel by the driver and as is well known the overall torque required to steer a vehicle generally diminishes with increasing vehicle speed. Whilst the current limiting arrangement provides a limit to the torque assistance provided by the motor and also provides protection for the motor and the drive circuits, the torque limit may not be appropriate for all driving conditions.

SUMMARY OF THE INVENTION

According to a first aspect of the present invention, there is provided a controller for an electric power assisted steering system comprising a drive circuit and a current limiter for limiting current supplied by the drive circuit to an electric motor of the system as a function of vehicle speed.

It is thus possible to provide a controller for an electric power assisted steering system which limits the amount of current supplied to the electric motor and thereby limits the amount of torque developed by the motor.

It is also possible to ensure that the magnitude of the motor current does not exceed a predetermined value determined as a function of the vehicle speed.

Preferably, the maximum current magnitude supplied to the electric motor decreases monotonically as the vehicle speed increases.

Preferably, the current supplied to the electric motor is controlled by pulse width modulation.

A sensor may be arranged to measure the current supplied to the electric motor. The sensor may be arranged to measure the absolute value or the magnitude of the motor current. The sensor may be a sense resistor.

The electric motor may be of the three or more-phase star-connected brushless permanent magnet type. Alternatively, the electric motor may be of the delta-connected type, multi-phase bridge with switched reluctance motor type or the two-phase bridge type.

An over-current trip may be provided whereby the current supplied to the electric motor is monitored and a disable signal generated if the motor current magnitude exceeds a predetermined value.

Preferably, a latch is provided to maintain the disable signal until the latch is reset.

Preferably, a vehicle speed sensor is provided. The speed sensor may be a toothed wheel with a sensing element, for example a Hall-effect sensor or an optical sensor. Alternatively, the sensor may be a reed switch activated or deactivated by a rotating magnet. The speed sensor may alternatively be a variable reluctance type sensor.

Preferably, more than one speed sensor may be provided to improve the integrity of vehicle speed measurement.

Alternatively, the current limiter may be arranged as an electronic circuit for generating a first predetermined threshold signal and a further current limiter may be arranged as part of microcontroller software which generates a second threshold signal. Preferably, the first threshold signal is higher than the second threshold signal.

It is thus still possible to limit the amount of unwanted assistance torque provided by the system in the event of a fault in the microcontroller.

The current limiter may comprise a memory for storing current limit data as a function of vehicle speed, a comparator for comparing the current supplied by the drive circuit to the motor with the current limit, and a circuit for loading the current limit data into the memory and for periodically examining the stored data.

Preferably the data loading circuit loads the current limit data into the memory each time power is applied to the system.

Preferably the controller comprises a safety circuit for preventing writing to the memory during normal operation of the system.

Preferably the controller comprises a data processor for periodically calculating the current limit as a function of speed. Preferably the controller comprises a current measuring arrangement for measuring the current supplied by the drive circuit to the motor.

It is thus possible to provide an arrangement which is periodically programmed, for example at the start of every vehicle journey, so as to account for sensor variations and hardware drift. Such an arrangement is immune to correction of the current limit by subsequent malfunction during the journey. Preferably the current limit and sensor configuration are stored in the memory, such as random access memory, only when the supply of current from the drive circuit to the motor is interrupted, for instance by independent means.

According to a second aspect of the invention, there is provided an electric power assisted steering system including a controller in accordance with the first aspect of the invention.

BRIEF DESCRIPTION OF THE DRAWINGS

The invention will be further described, by way of example, with reference to the accompanying drawings, in which.

Like reference numerals refer to like parts throughout the drawings.

DETAILED DESCRIPTION OF THE PREFERRED EMBODIMENT

Figure 1:
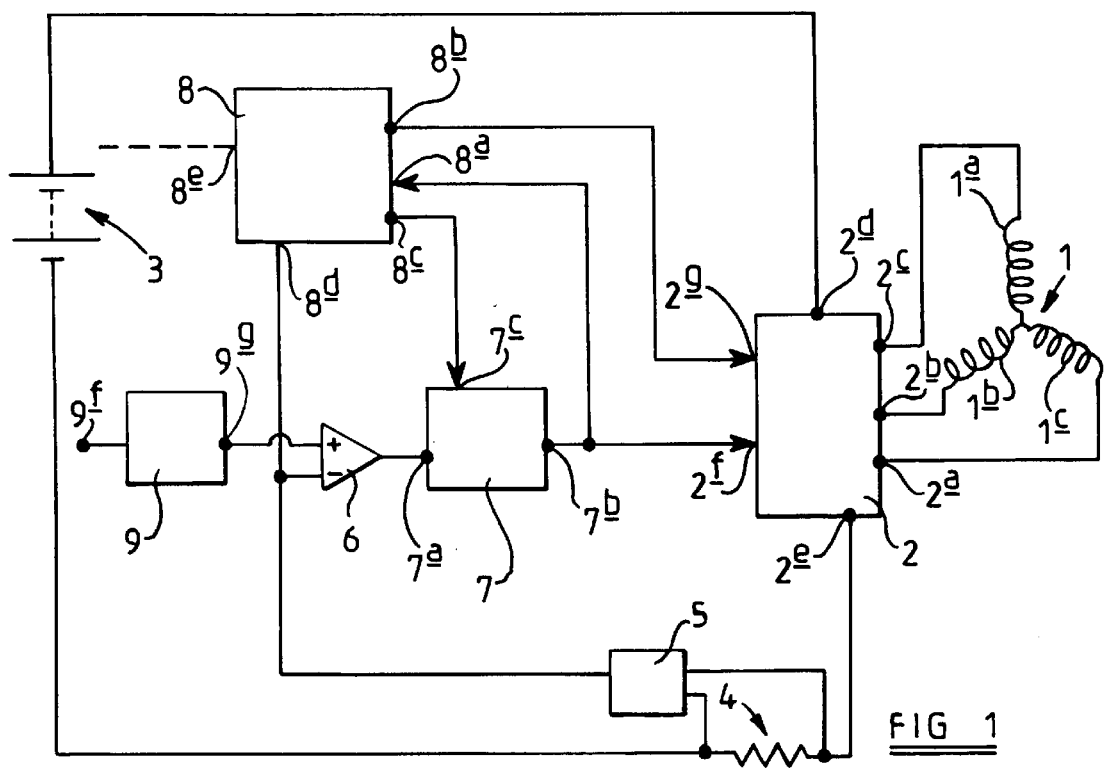
FIG. 1 shows a circuit according to an embodiment of the present invention.

The circuit of FIG. 1 comprises a three-phase star-connected coil arrangement 1 of an electric motor (not shown) which forms part of an EPAS system in a vehicle. The coil arrangement 1 has subsidiary coils 1a, 1b, 1c, each having a first terminal and a second terminal, the first terminals of the subsidiary coils 1a, 1b, 1c being connected together so as to form a three-phase star connection. It is, however, conceivable to use other coil arrangements, for example, a more than three-phase star-connection, a delta-connected arrangement, a multi-phase bridge with switched reluctance motor arrangement or a two-phase bridge arrangement. The second terminal of each subsidiary coil 1a, 1b, 1c is connected to a respective drive output terminal 2c, 2b, 2a of a driver circuit 2 comprising power devices (not shown) which are pulse width modulated and driven sequentially to drive the coil arrangement 1. The positive terminal of a power supply 3 is connected to a first power terminal 2d of the driver circuit 2 and the negative terminal of the power supply 3 is connected to a second power terminal 2e of the driver circuit 2 via a sense resistor 4.

The terminals of the sense resistor 4 are connected to a motor current measuring circuit 5 having an output terminal connected to the inverting input terminal of a differential voltage comparator 6. The inverting input terminal of the comparator 6 is connected to an output terminal of a current limit threshold generator 9 which receives a vehicle speed signal at its input terminal 9f. The output terminal of the comparator 6 is connected to an input terminal 7a of a latch circuit 7 also having a disable output terminal 7b and a reset input terminal 7c. The disable output terminal 7b of the latch circuit 7 is connected to a respective disable input terminal 2f of the driver circuit 2 and to an input terminal 8a of a microcontroller unit MCU 8. The MCU 8 also receives a torque signal which is applied to an input terminal (not shown), the torque signal being representative of the torque exerted by the driver on the vehicle steering wheel.

A set of drive output terminals 8b of the MCU 8 is connected to a set of drive input terminals 2g of the driver circuit 2. A reset output terminal 8c of the MCU 8 is connected to the reset input terminal 7c of the latch circuit 7.

During normal operation, current is supplied to the coil arrangement 1 by the driver circuit 2 via the drive output terminals 2a, 2b, 2c in response to the drive signals supplied from the drive output terminals 8b of the MCU 8. The motor current measuring circuit 5 provides a signal corresponding to the potential difference across the sense resistor 4 as an indication of the magnitude, or absolute value, of the current supplied to the motor 1 by the driver circuit 2 from the power supply 3. The circuit is arranged to operate over a range of currents that exceeds the maximum current expected in normal operation. This signal is compared by the comparator 6 with the current limit threshold signal from the output terminal 9f of the threshold generator 9.

If the magnitude of the current supplied by the driver circuit 2 exceeds the current limit threshold signal, the latch circuit 7 issues a disable signal to the driver circuit 2 and the MCU 8 in response to the output signal from the comparator 6 and the power devices in the driver circuit are turned off to isolate the motor. The disable signal is also monitored by the MCU 8 and if the MCU 8 is operating correctly a reset signal is sent from the reset output terminal 8c of the MCU 8 to the latch circuit 7 when the current supplied to the coil arrangement 1 falls below a predetermined value. For this purpose, the output signal of the measuring circuit 5 is supplied to terminal 8d of the MCU.

Figure 2:
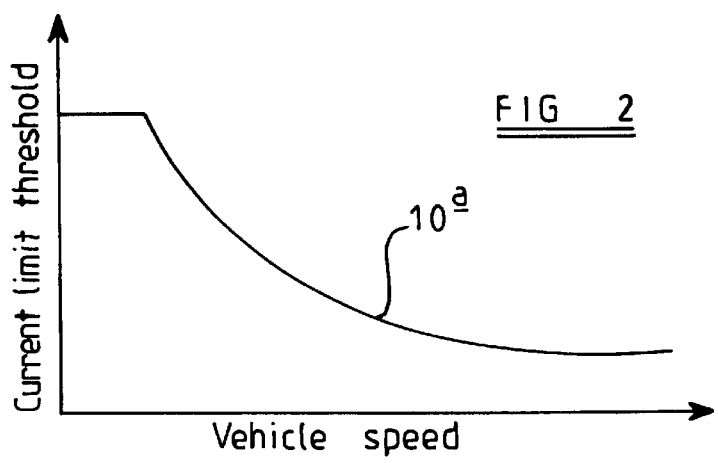
FIG. 2 shows a characteristic curve used with the circuit of FIG. 1.

Referring to FIG. 2, the current limit threshold generator 9 generates a threshold signal 10a which varies in response to vehicle speed, an indication of which is provided by a speed sensor (not shown), for example a Hall-effect sensor, an optical sensor, a reed switch activated or deactivated by a rotating magnet, or a variable reluctance type sensor. More than one speed sensor can be used in order to increase the integrity of the system which might be compromised by the failure of the speed sensor and in this case the current limit should be controlled in response to the output of the sensor giving the higher or highest vehicle speed. The signal 10a of FIG. 2 decreases monotonically as the vehicle speed increases.

Figure 4:
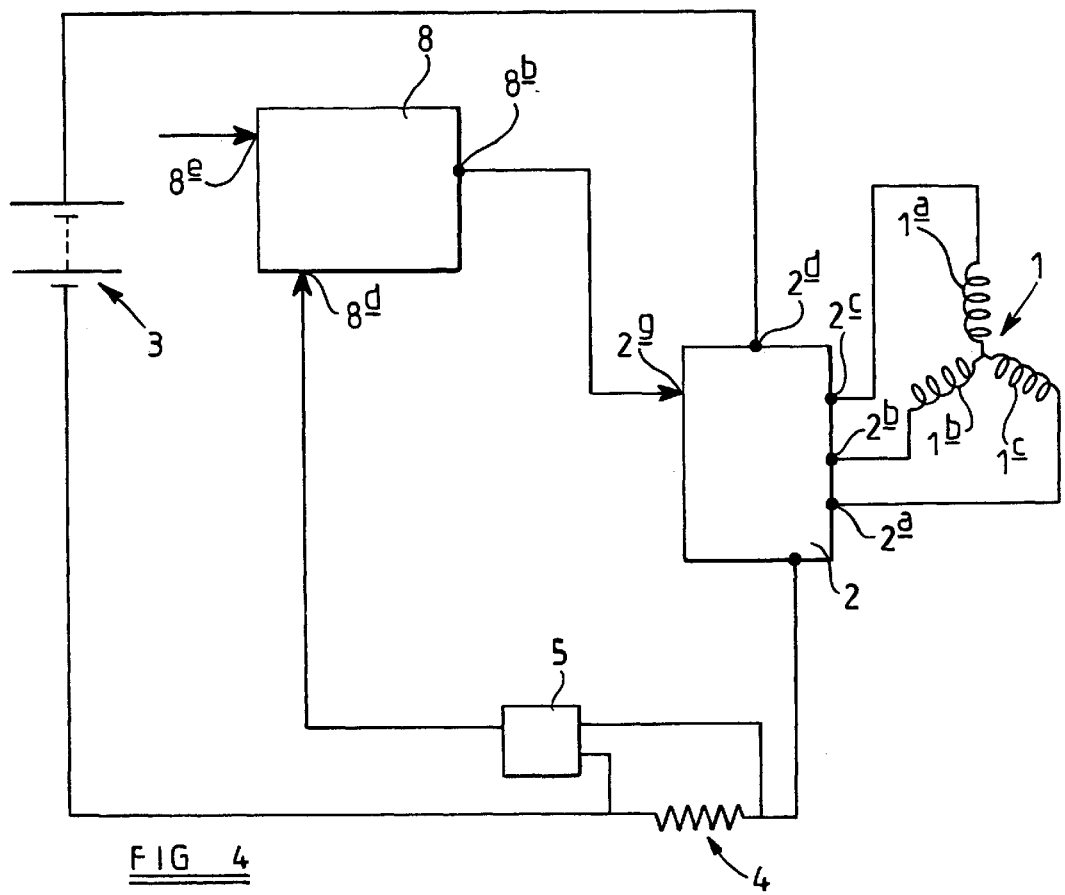
FIG. 4 shows a circuit according to further embodiment of the present invention.

In a modified example as shown in FIG. 4, the comparator 6, the latch circuit 7 and the threshold generator 9 are omitted. The output terminal of the motor current measurement circuit 5 is connected to the current sense input terminal 8d of the MCU 8, the MCU 8 also being provided with a speed sensor input terminal 8e for receiving a signal corresponding to the vehicle speed. The software of the MCU 8 limits the drive signals from the drive output terminals 8b as a function of the vehicle speed in accordance with the curve 10a of FIG. 2. The current supplied to the coil arrangement 1 by the driver circuit 2 is therefore limited to a value which does not exceed a predetermined level which is a function of the vehicle speed.

Figure 3:
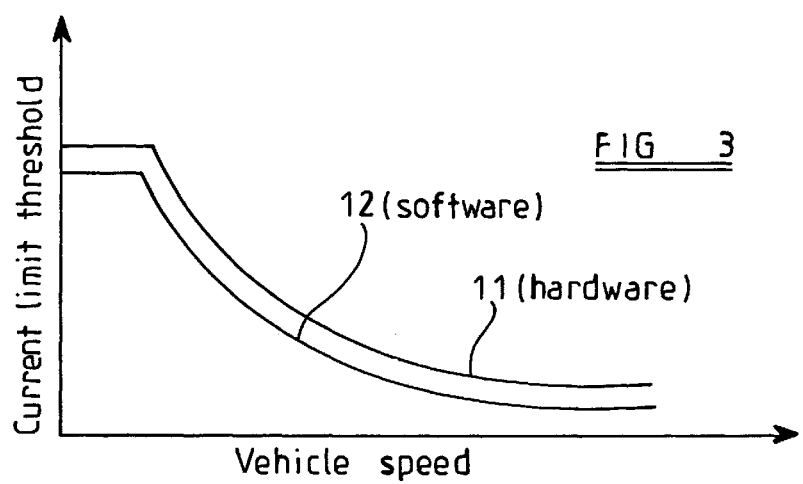
FIG. 3 shows two characteristic curves of an example of another embodiment of the present invention.

In a further modified example illustrated with reference to FIG. 1, the MCU 8 is supplied with a vehicle speed signal at terminal 8e and also with the output of the current measurement circuit 5 at terminal 8d. The threshold generator 9 generates a first predetermined threshold signal 11 (FIG. 3) to control the operation of the latch circuit 7 as described and the software of the MCU 8 is arranged to limit the current by limiting the drive signal from the drive output terminals 8b as a function of the vehicle speed in accordance with a second threshold signal 12. The first threshold signal is greater than the second threshold signal and in normal operation the MCU 8 will limit the motor current before the latch circuit 7 can operate. Therefore, if the MCU 8 develops a fault or the software of the MCU 8 tries to cause a large current to flow to the coil arrangement 1 at a high vehicle speed, the current would still be limited by the hardware arrangement.

Figure 5:
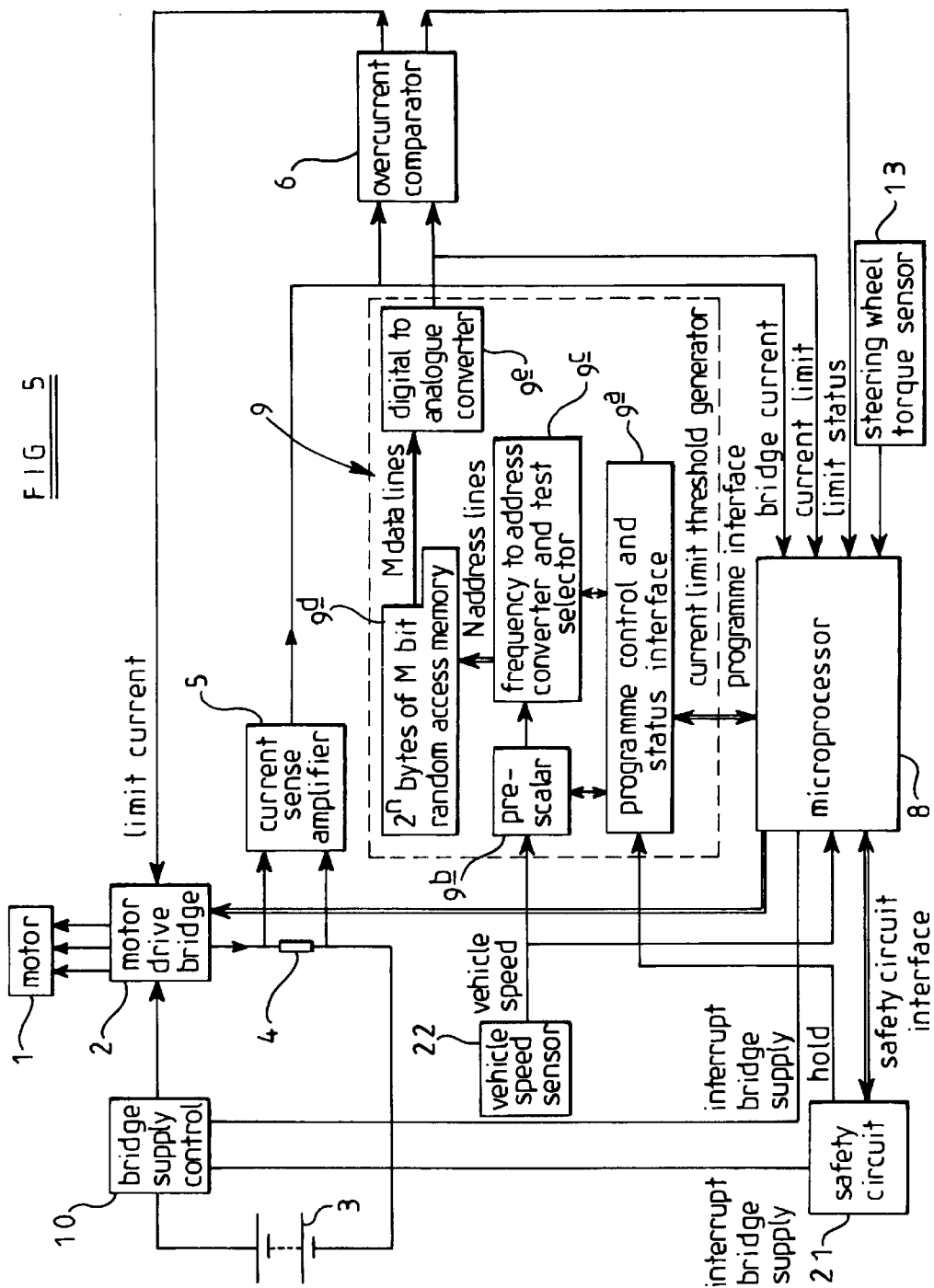
FIG. 5 is a block schematic diagram of a EPAS system constituting an embodiment of the invention.

The EPAS system shown in FIG. 5 comprises a three-phase motor 1 for providing steering power assistance connected to a motor drive bridge circuit 2. The bridge circuit 2 is connected via a bridge supply control circuit 10 to the positive terminal of a power supply 3 such as a vehicle battery and via a current sense resistor 4 to the negative terminal of the power supply 3. The output of a steering wheel torque sensor 13 is connected to an input of a microprocessor 8 having an output connected to the bridge circuit 2 for controlling motor drive current by pulse width modulation. The microprocessor 8 has an output connected to a safety circuit 21 which has an output connected to the bridge supply control circuit 10. The safety circuit 21 monitors the correct operation of the microprocessor 8. Such a circuit is described in EP 0 701 207. A current sense amplifier 5 has inputs connected across the sense resistor 4 and an output for supplying to the microprocessor 8 a signal representing the current supplied by the bridge circuit 2 to the motor 1.

The controller further comprises a current limit threshold generator 9 connected to the microprocessor 8. A vehicle speed sensor 22 is connected to inputs of the generator 9 and the microprocessor 8. The safety circuit 21 has an output connected to an input of the generator 9. An over-current comparator 6 has inputs connected to an output of the generator 9 and to the output of the current sense amplifier 5. The output of the generator 9 is also connected to the microprocessor 8. The comparator 6 has a first output connected to a current limit input of the bridge circuit 2 and a second limit status output connected to the microprocessor 8.

During normal operation of the EPAS system, the bridge supply control circuit 10 connects the power supply 3 to the motor drive bridge circuit 2 under control of the microprocessor 8 and the safety circuit 21. The microprocessor 8 receives a vehicle speed signal from the sensor 22 and a torque signal from the sensor 13 and calculates the amount of steering assistance required. A signal representing the required steering assistance torque is supplied to the bridge circuit 2 in the form of a pulse width modulated signal so as to control the current supplied to the motor 1 in order to generate the desired assistance torque. In normal operation, the maximum amount of assistance torque demanded of the system will decrease with increasing vehicle speed.

Figure 6:
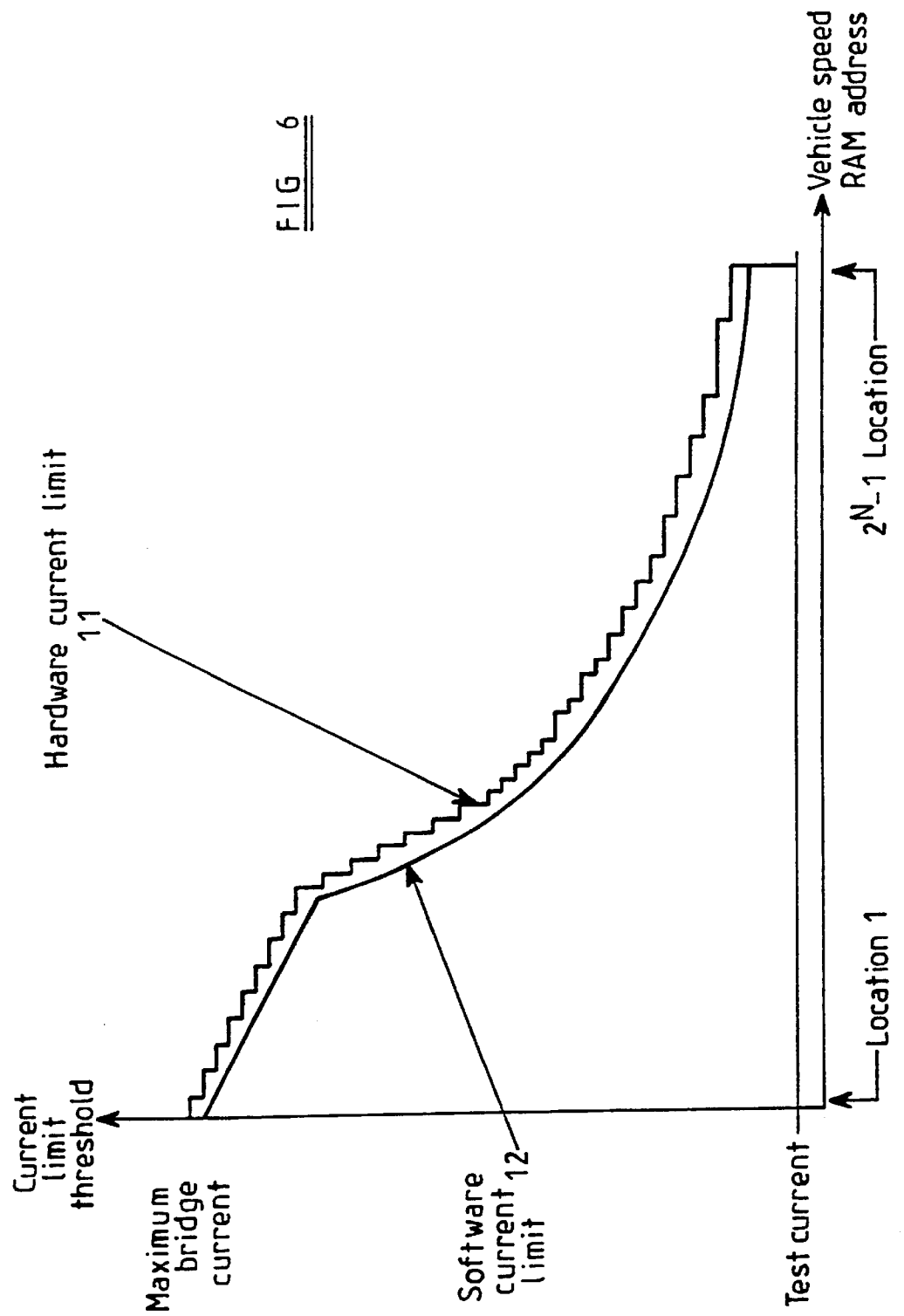
FIG. 6 is a graph of current limit threshold against vehicle speed.

The microprocessor also calculates a software current limit as a function of vehicle speed as illustrated at 12 in FIG. 6. The microprocessor compares the bridge current determined by the sense resistor 4 and the current sense amplifier 5 with the software current limit and, if the limit is exceeded, adjusts the drive signal supplied to the bridge circuit 2 to as to reduce the motor current to the limit value.

The current limit threshold generator 9 generates a hardware current limit as a function of vehicle speed as indicated at 11 in FIG. 6. The over-current comparator 6 compares the threshold with the current supplied to the motor and, if the limit is exceeded, supplies a limit current signal to the bridge circuit 2 so as to reduce the motor current to the limit value at the prevailing vehicle speed.

The current limit threshold generator 9 comprises a program, control and status interface 9a connected to the microprocessor 8. The interface 9a is connected to a pre-scalar 9b and to a frequency-to-address converter and test cell selector 9c. The circuit 9c is connected to a random access memory 9d comprising $2^N$ bytes, each of which comprises M bits. The memory 9d is connected by M datalines to a digital-to-analogue converter 9e whose output supplies the hardware current limit.

At power-up and power-down, the microprocessor 8 checks the operation of the safety circuit 21 prior to power assistance being provided. The safety circuit 21 then monitors operation of the microprocessor and only controls the bridge supply control circuit 10 to supply power to the bridge circuit 2 when the microprocessor is responding as expected. Thus, power assistance is only permitted when the microprocessor is operating correctly and the safety circuit 21 has been functionally checked.

Although the microprocessor 8 normally limits the motor current, the hardware limiting arrangement comprising the generator 9 and the comparator 6 prevents the microprocessor 8 from driving the bridge circuit 2 in such a way as to generate excessive assistance torque. During power-up, the microprocessor 8 uses its stored software current limit to generate $2^N$-1 M bit current levels corresponding to defined vehicle speed ranges, together with a single M bit value corresponding to a specific low bridge current. It is illustrated by the graph 11 in FIG. 6. The resulting $2^N$ M bit bytes of data are then programmed into the memory 9d via the interface 9a. The microprocessor 8 also calculates a vehicle speed input frequency pre-scalar factor so as to adapt the generator 9 to the speed/frequency factor of the vehicle speed sensor 22. During power-up, an internal test mode causes a divided version of the internal clock signal to be output to the processor. This permits the processor to adjust the stored data to compensate for variations in the threshold generator circuit.

The microprocessor then starts to control the safety circuit monitor 21. When the safety circuit 21 is under control, it removes its interruption of power supply via the bridge supply control circuit 10 and supplies a hold signal to the interface 9a. The hold signal prevents the microprocessor 8 from altering the data stored within the generator 9 i.e. in the pre-scalar 9b and in the random access memory 9d. However, the microprocessor 8 is still permitted to read the stored data for fault monitoring purposes. If control of the safety circuit 21 is lost during operation, it is possible for the microprocessor 8 to corrupt the data stored within the generator. However, the loss of control also results in the safety circuit 21 preventing the bridge supply control circuit 10 from supplying power to the drive circuit 2 so that power assistance is disabled and generation of erroneous assistance torque is prevented.

The varying frequency input from the vehicle speed sensor 22 is divided by the stored pre-scalar ratio in the pre-scalar 9b and converted to a random access memory address by the converter 9c. The data stored in the memory 9d at the address location are supplied to the converter 9e which converts the data to an analogue current limit value which is supplied to the comparator 6. When the current supplied to the motor exceeds the limit value, the comparator 6 supplies a signal to the bridge circuit 2 for limiting the current to the limit value or for preventing the supply of current to the motor 1 so as to limit any erroneous assistance torque. The microprocessor 8 also monitors the current limit output from the generator 9 to allow checking of the internal functioning of the generator. Thus, the microprocessor 8 can check the stored data and operation of the generator 9 and remove torque assistance if it is determining that the hardware over-current protection would not operate correctly if required.

The microprocessor is arranged to use all of the available locations in the memory 9d so as to provide the best vehicle speed resolution. Alternatively, if the current limit curve is flat at high vehicle speeds, the converter 9c may be permitted to overflow so as to give repeated selection of the current limit at the $2^N$-1 location.

The $2^N$ location of the memory 9d stores a low current limit value which is selected by the microprocessor 8, for instance at the end of a journey, for testing the operation of the comparator 6 by checking the state of the limit status signal. Inadvertent selection of this test function during operation merely results in a low assistance torque limit being selected.

The microprocessor may be arranged to attempt to reprogram the memory 9d after the safety circuit monitor 21 is controlled so as to ensure that the hold function has not allowed the data stored in the memory 9d to be changed. If this test is performed satisfactorily, the microprocessor 8 permits power assistance to be provided.

As shown in FIG. 6, the software current limit characteristic is lower than the hardware current limit characteristic at all vehicle speeds.

It is thus possible to provide a controller for an EPAS system in which the maximum magnitude of the motor current/vehicle speed characteristic is defined when the programming device such as the microprocessor 8 is itself programmed. A wide range of speed sensor characteristics can be covered without component changes so that, for instance, the same system may be used on different vehicles having different vehicle speed sensors 22. On every journey of the vehicle, the stored current limit data may be adjusted to accommodate drift in external current sense hardware. Corruption of the stored data, data selection logic and resultant current limit levels can be detected during operation. Operation of the current limit hardware can be validated before steering assistance is provided. Adaptability and reliability of the EPAS system are therefore provided.

All outputs from the current limit threshold generator and safety circuit which are monitored by the processor must be buffered to ensure correct operation in the case of a malfunctioning processor outputting signals on its inputs.

What is claimed is:

1. A controller for an electric power assisted steering system, comprising a drive circuit for driving a power assist motor in accordance with at least a driver input and a current limiter arranged to limit the magnitude of current in accordance with a first current limit function which decreases monotonically with increasing vehicle speed, and a data processor programmed to limit the current supplied by the drive circuit in accordance with a second current limit function which decreases monotonically with increasing vehicle speed and which is less than the first current limit function at every vehicle speed wherein the first current limit function is used to provide a hardware current limit and the second current limit function is used to provide a software current limit, the controller being used to provide a backup hardware current limit when the data processor fails.

2. A controller as claimed in claim 1, comprising a resettable latch connected between the drive circuit and the current limiter.

3. A controller as claimed in claim 1, in which the current limiter comprises a memory for storing current limit data as a function of vehicle speed, a comparator for comparing-the current supplied by the drive circuit to the motor with a stored current limit, and a circuit for loading the current limit data into the memory and for periodically examining the stored data.

4. A controller as claimed in claim 3, in which the data loading circuit is arranged to load the current limit data into the memory each time power is applied to the system.

5. A controller as claimed in claim 3, comprising a safety circuit for preventing writing to the memory during normal operation of the system.

6. A controller as claimed in claim 1, comprising a data processor for periodically calculating the current limit as a function of vehicle speed.

7. A controller as claimed in claim 1, comprising a current measuring arrangement for measuring the current supplied by the drive circuit to the motor.

8. An electric power assisted steering system including a controller comprising a drive circuit for driving a power assist motor in accordance with at least a driver input and a current limiter arranged to limit the magnitude of current in accordance with a first current limit function which decreases monotonically with increasing vehicle speed, and a data processor programmed to limit the current supplied by the drive circuit in accordance with a second current limit function which decreases monotonically with increasing vehicle speed and which is less than the first current limit function at every vehicle speed wherein the first current limit function is used to provide a hardware current limit and the second current limit function is used to provide a software current limit, the controller being used to provide a backup hardware current limit when the data processor fails.

* * * * *